United States Patent
Kim et al.

(10) Patent No.: US 11,251,469 B2
(45) Date of Patent: Feb. 15, 2022

(54) LAMINATION APPARATUS FOR SECONDARY BATTERY

(71) Applicant: LG Chem, Ltd., Seoul (KR)

(72) Inventors: Won Nyeon Kim, Daejeon (KR); Jung Kwan Pyo, Daejeon (KR); Cha Hun Ku, Daejeon (KR); Tae Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 32 days.

(21) Appl. No.: 16/348,297

(22) PCT Filed: Mar. 27, 2018

(86) PCT No.: PCT/KR2018/003625
§ 371 (c)(1),
(2) Date: May 8, 2019

(87) PCT Pub. No.: WO2018/199484
PCT Pub. Date: Nov. 1, 2018

(65) Prior Publication Data
US 2020/0235433 A1     Jul. 23, 2020

(30) Foreign Application Priority Data
Apr. 26, 2017   (KR) .................. 10-2017-0053711

(51) Int. Cl.
*H01M 10/0585*   (2010.01)
*H01M 50/46*     (2021.01)

(52) U.S. Cl.
CPC ....... *H01M 10/0585* (2013.01); *H01M 50/46* (2021.01)

(58) Field of Classification Search
CPC combination set(s) only.
See application file for complete search history.

(56) References Cited

U.S. PATENT DOCUMENTS 9,425,478 B2    8/2016  Yuhara et al.
2013/0260211 A1  10/2013  Min et al.
(Continued)

FOREIGN PATENT DOCUMENTS

CN    102544568 A   7/2012
CN    102646849 A   8/2012
(Continued)

OTHER PUBLICATIONS

English translation of JP2012160352A, Kengo, 2011 (Year: 2011).*
Supplementary European Search Report corresponding to European Patent Application No. 18791163.1 dated Sep. 25, 2019, 7 pages.

*Primary Examiner* — Ula C Ruddock
*Assistant Examiner* — Sarika Gupta
(74) *Attorney, Agent, or Firm* — Birch, Stewart, Kolasch & Birch, LLP

(57) ABSTRACT

A lamination apparatus for a secondary battery comprises a roller part comprising a separator supply roller that supplies a separator sheet and an electrode supply roller that supplies an electrode sheet, a cutting part that cuts the electrode sheet supplied by the electrode supply roller to manufacture a plurality of electrode plates, a first transfer part that transfers the electrode plates cut by the cutting part at a same interval, an inspection part that inspects whether the electrode plates transferred by the first transfer part are defective, a second transfer part that transfers a normal electrode plate, which is determined as the normal electrode plate by the inspection part, among the electrode plates, and a lamination part that thermally bonds the normal electrode plate transferred by the second transfer part to the separator sheet supplied by the separator supply roller.

5 Claims, 4 Drawing Sheets

(56) References Cited

U.S. PATENT DOCUMENTS

| | | |
|---|---|---|
| 2014/0020239 A1 | 1/2014 | Yuhara et al. |
| 2014/0059875 A1 | 3/2014 | Yuhara et al. |
| 2017/0033384 A1 | 2/2017 | Cho |
| 2017/0069905 A1* | 3/2017 | Koike ............... H01M 10/0413 |

FOREIGN PATENT DOCUMENTS

| | | |
|---|---|---|
| CN | 103460485 A | 12/2013 |
| CN | 106505238 A | 3/2017 |
| EP | 2696423 A1 | 2/2014 |
| JP | H10-144359 A | 5/1998 |
| JP | 2001-338642 A | 12/2001 |
| JP | 2012-160352 A | 8/2012 |
| JP | 2012-174453 A | 9/2012 |
| JP | 2012-227124 A | 11/2012 |
| JP | 5561191 B2 | 7/2014 |
| JP | 2016-070685 A | 5/2016 |
| JP | 2017-033915 A | 2/2017 |
| KR | 10-2001-0064829 A | 7/2001 |
| KR | 10-0669421 B1 | 1/2007 |
| KR | 10-1015988 B1 | 2/2011 |
| KR | 10-2013-0137232 A | 12/2013 |
| KR | 10-2014-0009015 A | 1/2014 |
| KR | 10-1355834 B1 | 1/2014 |
| KR | 10-1479723 B1 | 1/2015 |
| KR | 10-2015-0037363 A | 4/2015 |
| KR | 10-2016-0012534 A | 2/2016 |

* cited by examiner

LAMINATION APPARATUS FOR SECONDARY BATTERY

CROSS-REFERENCES TO RELATED APPLICATIONS

This application is a U.S. national phase application, pursuant to 35 U.S.C. § 371, of PCT/KR2018/003625, filed Mar. 27, 2018, designating the United States, which claims priority to Korean Application No. 10-2017-0053711, filed Apr. 26, 2017. The entire contents of the aforementioned patent applications are incorporated herein by this reference.

CROSS-REFERENCE TO RELATED APPLICATION

The present application claims the benefit of the priority of Korean Patent Application No. 10-2017-0053711 filed on Apr. 26, 2017, which is hereby incorporated by reference in its entirety.

TECHNICAL FIELD

The present invention relates to a lamination apparatus for a secondary battery, and more particularly, to a lamination apparatus for a secondary battery, which inspects whether an electrode is defective before the electrode and a separator are thermally bonded to each other.

BACKGROUND ART

In general, secondary batteries are chargeable and dischargeable unlike primary batteries that are not chargeable and are widely used in electronic devices such as mobile phones, notebook computers, camcorders, and the like, or electric vehicles and the like.

Such a secondary battery comprises an electrode assembly and a case that accommodates the electrode assembly, and the electrode assembly has a structure in which a separator and electrodes are vertically laminated.

The electrode assembly requires a lamination process of thermally bonding a separator to an electrode. In other words, in the lamination space, the separator and the electrode, which are vertically laminated, are heated and bonded to each other to improve the bonding between the separator and the electrode.

However, although defective electrodes exist among the thermally bonded electrodes, the lamination process does not comprise a process of inspecting the electrodes. Thus, there has been a problem that a defect rate of the electrode assembly significantly increases.

DISCLOSURE OF THE INVENTION

Technical Problem

The present invention has been made to solve the above problems, and an object of the present invention is to provide a lamination apparatus for a secondary battery, which inspects whether an electrode is defective before a separator and the electrode are thermally boned to each other to significantly reduce a defect rate of an electrode assembly.

Technical Solution

To achieve the above-described object, a lamination apparatus for a secondary battery, which thermally bonds a separator sheet to an electrode plate in a state in which the separator sheet and the electrode plate are laminated, according to the present invention comprises a roller part comprising a separator supply roller that supplies the separator sheet and an electrode supply roller that supplies the electrode sheet; a cutting part that cuts the electrode sheet supplied by the electrode supply roller to manufacture a plurality of electrode plates; a first transfer part that transfers the electrode plates cut by the cutting part at the same interval; an inspection part that inspects whether the electrode plates transferred by the first transfer part are defective; a second transfer part that transfers a normal electrode plate, which is determined as the normal electrode plate by the inspection part, among the electrode plates; and a lamination part that thermally bonds the normal electrode plate transferred by the second transfer part to the separator sheet supplied by the separator supply roller.

The inspection part may comprise a photographing member that photographs the electrode plate transferred by the first transfer part and an inspection member that compares a photograph of the electrode plate, which is photographed by the photographing member, with an inputted photograph of the electrode plate to inspect whether the electrode plate is defective.

The cutting part may cut the electrode sheet to manufacture an electrode plate on which an electrode tab is provided, and the inspection member may inspect whether a connection state of the electrode tab provided on the electrode plate is defective.

The inspection part may further comprise a discharge member that discharges a defective electrode plate, which is determined as the defective electrode plate by the inspection member, from the first transfer part.

The first transfer part and the second transfer part may rotate at a same rotation rate to uniformly maintain a distance between the electrode plates transferred by the first transfer part and the second transfer part, and when the defective electrode plate of the electrode plates transferred by the first transfer part is discharged, a rotation rate of the first transfer part may be increased to be greater than a rotation rate of the second transfer part to re-adjust a distance between a preceding electrode plate and a following electrode plate with respect to the defective electrode plate.

When the discharge member discharges the defective electrode plate disposed on an end of the first transfer part in a transfer direction of the first transfer part, the rotation rate of the first transfer part is increased to re-adjust a distance between the preceding electrode plate and the following electrode plate with respect to the defective electrode plate.

The first transfer part may comprise a first conveyor belt that transfers the electrode plates cut by the cutting part at predetermined intervals.

The first transfer part may further comprise a first adjustment roller that adjusts a position of the electrode plate in a width direction of the electrode plate while press-rolling a top surface of the electrode plate transferred by the first conveyor belt.

The second transfer part may comprise a second conveyor belt that transfers the normal electrode plates, which are determined as the normal electrode plates by the inspection part, at predetermined intervals.

The second transfer part may further comprise a second adjustment roller that adjusts a position of the normal electrode plate in a width direction of the electrode plate while of press-rolling the normal electrode plate transferred by the second conveyor belt.

Advantageous Effects

First, the lamination apparatus for the secondary battery according to the present invention may inspect the electrode plate before the separator sheet and the electrode plate are thermally bonded to each other to remove the defective electrode plate. Thus, the normal electrode plate and the separator sheet may be thermally bonded to each other to significantly reduce the defect rate of the electrode assembly.

Second, the lamination apparatus for the secondary battery according to the present invention may comprise the inspection part that photographs the electrode plate to compare a photographed image of the electrode plate with an inputted image of the electrode plate and thereby to inspect whether the electrode plate is defective. Thus, the defects of the electrode plate may be more accurately inspected by the inspection part.

Third, the inspection part of the lamination apparatus for the secondary battery according to the present invention may comprise the discharge member for discharging and removing the electrode plate that is determined as a defective electrode plate to the outside to previously prevent the defective electrode plate from being thermally bonded to the separator sheet by the discharge member.

Fourth, the lamination apparatus for the secondary battery according to the present invention may comprise the first and second transfer part for transferring the electrode plate. The rotation rate of the first transfer part may be increased when the defective electrode plate is discharged to uniformly maintain the distance between the electrode plates, which are respectively disposed at preceding and following sides of the defective electrode plate. Thus, the electrode plates may be always transferred at the constant intervals.

MODE FOR CARRYING OUT THE INVENTION

Figure 1:
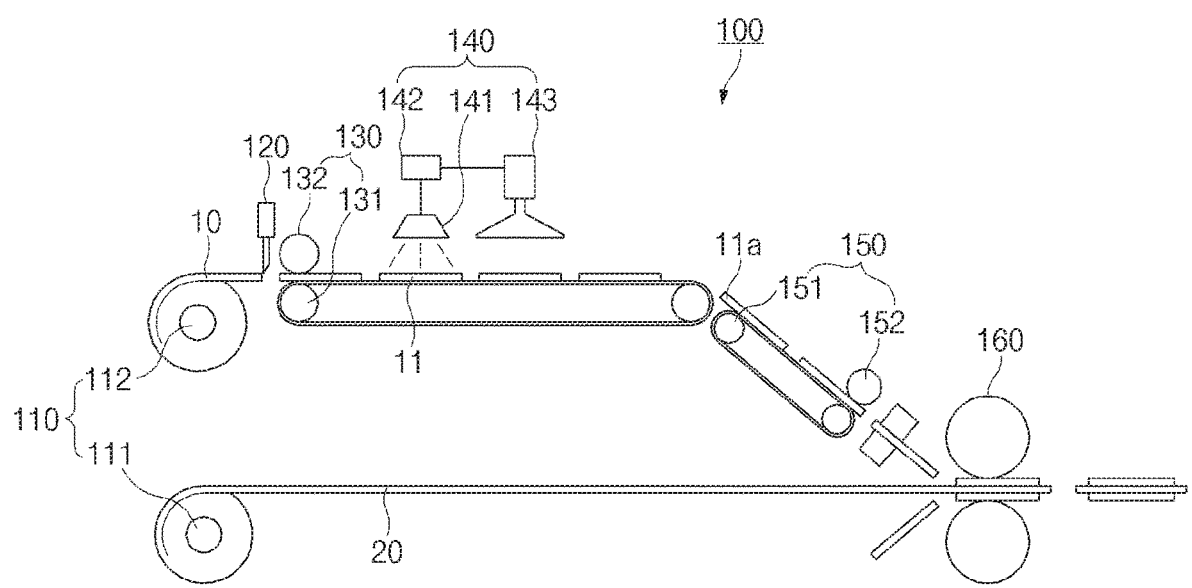
FIG. 1 is a view of a lamination apparatus for a secondary battery according to an embodiment of the present invention.
Figure 2:
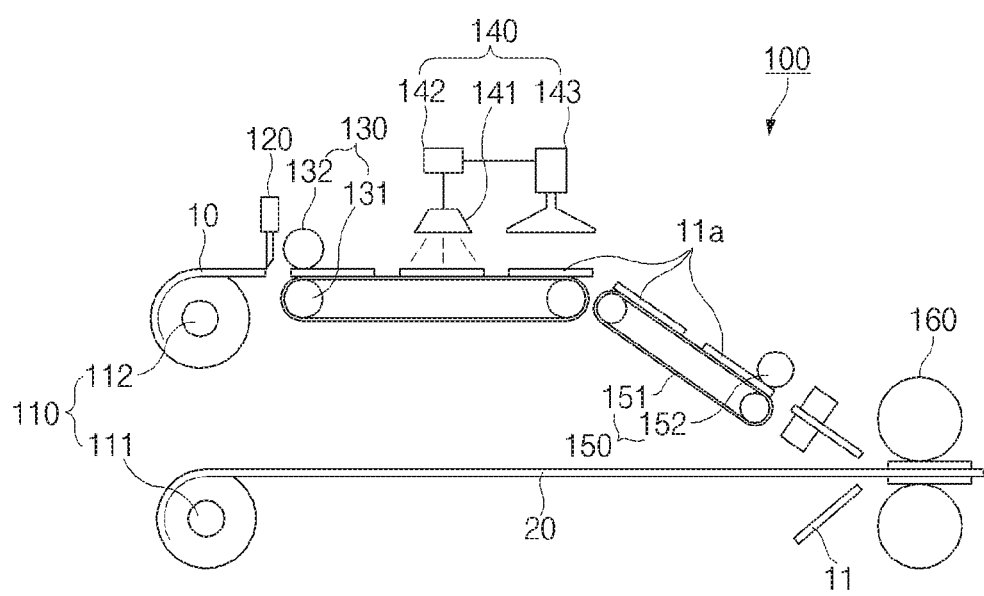
FIG. 2 is a view illustrating a state in which a normal electrode plate is transferred in the lamination apparatus for the secondary battery according to an embodiment of the present invention.
Figure 3:
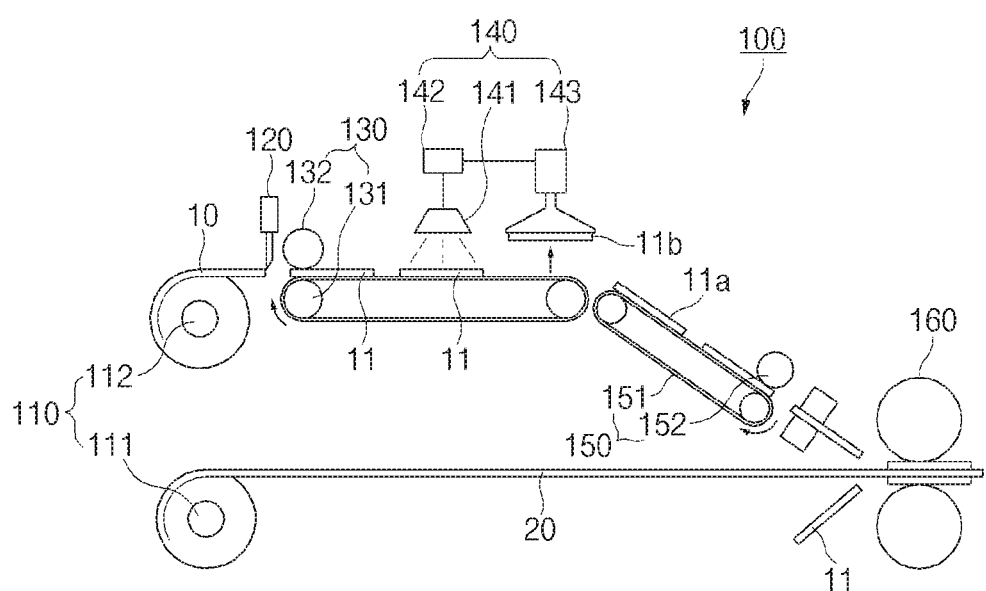
FIG. 3 is a view illustrating a state in which a defective electrode plate is inspected and discharged in the lamination apparatus for the secondary battery according to an embodiment of the present invention.
Figure 4:
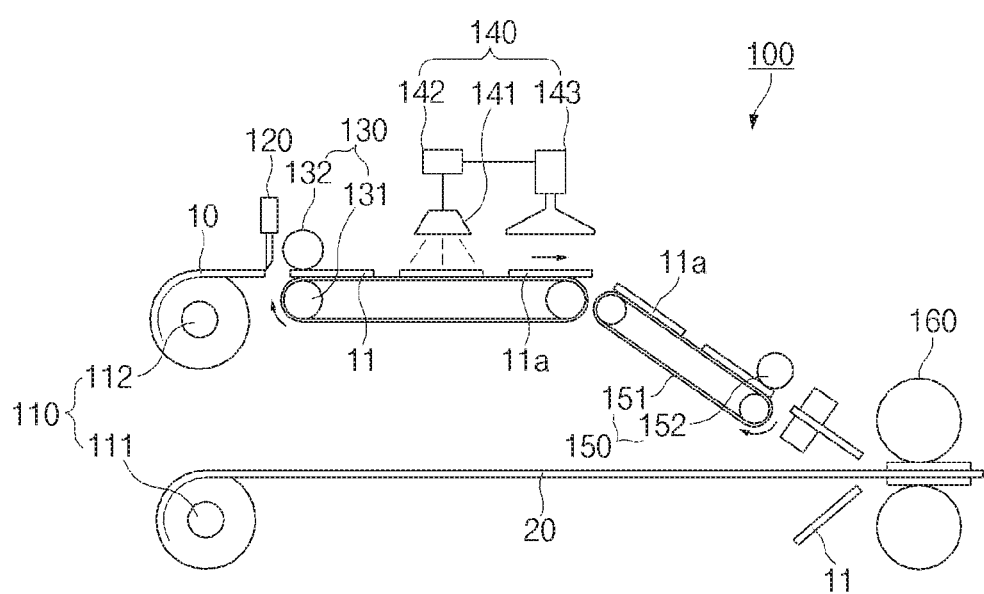
FIG. 4 is a view illustrating a state in which a distance between the normal electrode plates is adjusted through rotation force of a first transfer part in the lamination apparatus for the secondary battery according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Lamination Apparatus for Secondary Battery According to an Embodiment of the Present Invention]

A lamination apparatus 100 for a secondary battery according to an embodiment of the present invention is configured to thermally bond a plurality of electrode plates 11, which are cut from a separator sheet 20 and an electrode sheet 10, to each other. Particularly, whether the electrode plates 11 are defective may be inspected before the separator sheet 20 and the electrode plate 11 are thermally bonded to each other to thermally bond only the normal electrode plate 11 to the separator sheet 20, thereby significantly reducing a defect rate of an electrode assembly that is manufactured through the above-described processes.

As illustrated in FIG. 1, the lamination apparatus 100 for the secondary battery according to an embodiment of the present invention comprises a roller part 110 that supplies the separator sheet 20 and the electrode sheet 10, a cutting part 120 that cuts the electrode sheet 10 to manufacture a plurality of electrode plates 11, a first transfer part 130 that transfers the electrode plates 11 at predetermined intervals, an inspection part 140 that inspects whether the electrode plates 11 transferred by the first transfer part 130 are defective, a second transfer part 150 that transfers a normal electrode plate 11a, which is determined as the normal electrode plate, among the electrode plates 11, and a lamination part 160 that thermally bonds the normal electrode plate 11a to the separator sheet 20.

The roller part 110 comprises a separator supply roller 111 around which the separator sheet 20 is wound and an electrode supply roller 112 around which the electrode sheet 10 is wound. The separator supply roller 111 supplies the wound separator sheet 20 to the lamination part 160, and the electrode supply roller 112 supplies the wound electrode sheet 10 to the first transfer part 130.

Here, the electrode sheet 10 comprises a first electrode sheet and a second electrode sheet. Thus, the electrode supply roller 112 may comprise a first electrode supply roller that supplies the first electrode sheet and a second supply roller that supplies the second electrode sheet.

The first electrode sheet is a positive electrode sheet, and the second electrode sheet is a negative electrode sheet, and vice versa.

The cutting part 120 cuts the electrode sheet 10 supplied by the electrode supply roller 112 at predetermined intervals to manufacture the plurality of electrode plates 11, and the plurality of cut electrode plates 11 are supplied to the first transfer part 130 at predetermined intervals.

In particular, the cutting part 120 comprises a cutting body disposed between the electrode supply roller 112 and the first transfer part 130 to move to the electrode sheet 10 and a cutting blade provided on the cutting body to cut the electrode sheet 10.

Here, the cutting part 120 may cut the electrode sheet 10 to manufacture the electrode plate 11 on which an electrode tab is formed.

The first transfer part 130 transfers the plurality of electrode plates 11 that are cut by the cutting part 120 to the second transfer part 150 at predetermined intervals. In particular, the first transfer part 130 comprises a first conveyor belt 131 that transfers one or more electrode plates 11. The first conveyor belt 131 more stably transfers the plurality of electrode plates 11 to the second transfer part 150.

The cut electrode plate 11 descends from the electrode sheet 10 by the cutting part 120 and then is seated on a front end of the first conveyor belt 131. Here, the electrode plate 11 seated on the first conveyor belt 131 may be irregularly seated to cause inaccurate inspection when defects of the electrode plates are inspected.

To prevent this problem, the cutting part 120 further comprises a first adjustment roller 132 that constantly adjusts a position of the electrode plate 11 seated on the first conveyor belt 131. The first adjustment roller 132 press-rolls the electrode plate 11 seated on the first conveyor belt 131 and simultaneously adjusts a position of the electrode plate 11 in a width direction.

The first adjustment roller 132 adjusts a time taken to press-roll the electrode plate 11 seated on the first conveyor belt 131 to adjust a distance between the electrode plates 11 transferred through the first conveyor belts 131. In particular, when a distance between the electrode plate 11 seated on the first conveyor belt 131 and the electrode plate in the front of the electrode plate 11 is relatively short, the first adjustment roller 132 increases the press-rolling time of the electrode plate 11 seated on the first conveyor belt 131 to adjust a distance between the electrode plate 11 seated on the first conveyor belt 131 and the electrode plate in the front of the electrode plate 11. When a distance between the electrode plate 11 seated on the first conveyor belt 131 and the electrode plate in the front of the electrode plate 11 is relatively long, the first adjustment roller 132 decreases the press-rolling time of the electrode plate 11 seated on the first conveyor belt 131 to adjust a distance between the electrode plate 11 seated on the first conveyor belt 131 and the electrode plate in the front of the electrode plate 11.

The inspection part 140 inspects whether the electrode plate 11 transferred by the first transfer part 130 is defective. In particular, the inspection part 140 comprises a photographing member 141 that photographs the electrode plate 11 transferred by the first transfer part 130 and an inspection member 142 that compares a photograph of the electrode plate photographed by the photographing member 141 with an inputted photograph of the electrode plate to inspect whether the electrode plate is defective.

Here, the inspection member 142 may inspect a connection state of an electrode tab provided on the electrode plate 11. In particular, the inspection member inspects defects such as whether cracks occur between the electrode plate and the electrode tab or whether the electrode tab is folded to detect a normal signal if defects do not exist or an abnormal signal if defects exist.

The inspection part 140 further comprises a discharge member 143 that removes the defective electrode plate 11b from the first transfer part 130. The discharge member 143 suctions the defective electrode plate 11b transferred by the first transfer part 130 to remove the defective electrode plate 11b from the first transfer part 130, thereby preventing the defective electrode plate 11b from being transferred to the second transfer part 150.

The first transfer part 130 and the second transfer part 150 rotate at a same rate to transfer the electrode plates 11 at predetermined intervals. Here, when the defective electrode plate 11b among the electrode plates transferred by the first transfer part 130 is discharged, a rotation rate of the first transfer part 130 is increased to be greater than a rotation rate of the second transfer part 130 to adjust a distance between a preceding electrode plate and a following electrode plate with respect to the defective electrode plate 11b. Thus, the distance between the preceding electrode plate and the following electrode plate with respect to the defective electrode plate may be adjusted.

When the rotation rate of the first transfer part 130 increases, an inspection speed of the inspection part 140 may also increase.

In addition, when the rotation rate of the first transfer part 130 increases, a rotation rate of the electrode supply roller 112 that supplies the electrode sheet may also increase. Thus, the electrode plate 11 may be more stably supplied to the first transfer part 130.

When the rotation rate of the electrode supply roller 112 increases, a cutting rate of the cutting part 120 may also be increased. Thus, the cutting rate of the cutting part 120 may be increased to match the supply rate of the electrode sheet. Therefore, the electrode plate 11 may be cut to a predetermined size.

The second transfer part 150 transfers a normal electrode plate 11a that is determined as a normal electrode plate by the inspection part 140 to the lamination part 160.

In particular, the second transfer part 150 comprises a second conveyor belt 151 that transfers the normal electrode plate 11a transferred by the first transfer part 130 to the lamination part 160. The normal electrode plate 11a may be stably transferred to the lamination part 160 by the second conveyor belt 151.

The second transfer part 150 further comprises a second adjustment roller 152 that uniformly adjusts a position of the normal electrode plate 11a transferred to the lamination part 160. The second adjustment roller 152 press-rolls the normal electrode plate 11a disposed at an end of the second conveyor belt 151 and simultaneously adjusts a position of the normal electrode plate 11a in the width direction.

Here, the second adjustment roller 151 may adjust a time taken to press-roll the normal electrode plate 11a. Thus, a distance between the normal electrode plates 11a transferred to the lamination part 160 may be more uniformly adjusted.

The lamination part 160 thermally bonds the normal electrode plate 11a transferred by the second transfer part 150 to the separator sheet 20 supplied by the separator supply roller 111.

The lamination apparatus for the secondary battery according to an embodiment of the present invention may remove the defective electrode plate before the separator sheet and the electrode plate are thermally bonded to each other. Thus, when the secondary battery is manufactured, the defect rate may be significantly reduced.

[Lamination Method for Secondary Battery According to an Embodiment of the Present Invention]

Hereinafter, a lamination method using the lamination apparatus 100 for the secondary battery according to an embodiment of the present invention will be described.

The lamination method for the secondary battery according to an embodiment of the present invention comprises a first step of supplying a separator sheet and an electrode sheet, a second step of cutting the electrode sheet to a predetermined size to manufacture a plurality of electrode plates, a third step of transferring the cut electrode plates at predetermined intervals, a fourth step of inspecting whether the transferred electrode plate is defective, a fifth step of transferring a normal electrode plate that is determined as a normal electrode plate, and a sixth step of thermally bonding the normal electrode plate to the separator sheet.

In the first step, each of the separator sheet 20 and the electrode sheet 10 is supplied through a roller part 110. In particular, the roller part 110 comprises a separator supply roller 111 around which the separator sheet 20 is wound and an electrode supply roller 112 around which the electrode sheet 10 is wound. The separator supply roller 111 supplies the wound separator sheet 20 to a lamination part 160, and the electrode supply roller 112 supplies the wound electrode sheet 10 to a first transfer part 130.

Here, the separator supply roller 111 and the electrode supply roller 112 may have a same rotation rate. When the rotation rate of the first transfer part 130 increases, the rotation rate of the electrode supply roller 112 may also increase. Thus, a distance between the electrode plates 11 transferred to the first transfer part 130 may be uniformly maintained.

In the second step, the electrode sheet 10 supplied by the electrode supply roller 112 may be cut by a cutting part 120 to manufacture a plurality of electrode plates 11, each of which has a predetermined size. The plurality of manufactured electrode plates 11 descend to be seated on the first transfer part 130.

Here, the cutting rate of the cutting part 120 may be increased when the rotation rate of the electrode supply roller 112 increases to supply the electrode sheet 10 faster. Thus, the electrode plate 11 may be manufactured always with a constant size.

In the third step, the electrode plates cut by the cutting part 120 are transferred at predetermined intervals. In particular, the electrode plate 11 cut by the cutting part 120 descends to a front end of the first conveyor belt 131 of the first transfer part 130 and is subsequently transferred to the second transfer part 150 at predetermined intervals by the first conveyor belt 131.

Here, the electrode plates 11 seated on the conveyor 131 may be irregularly seated. The irregularly seated electrode plates 11 may be uniformly adjusted in position by the first adjustment roller 132.

In other words, the first adjustment roller 132 is disposed at the front of the first conveyor belt 131 to which the cut electrode plate 11 is supplied from the cutting part 120, and a top surface of the electrode plate 11 seated on the first conveyor belt 131 is press-rolled, and simultaneously, the electrode plate 11 is adjusted in position in a width direction. Accordingly, the electrode plates 11 transferred through the first conveyor belt 131 may be disposed at the same position, and thus, the electrode plates 11 may be stably inspected by the inspection part 140.

In the fourth step, whether the electrode plate transferred to the first transfer part 130 is defective is inspected by the inspection part 140. In particular, the inspection part 140 photographs the electrode plate 11 disposed on the first transfer part by the photographing member 141. Subsequently, the image photographed by the photographing member 141 is compared with an inputted image of the electrode plate by the inspection member 142 to inspect whether the electrode plate is defective. For example, the inspection member 142 inspects a connection state of an electrode tab provided on the electrode plate. Here, the inspection member 142 inspects whether cracks occur between the electrode plate and the electrode tab, or whether the electrode tab is folded.

Here, in the fourth step, the normal electrode plate 11a that is determined as a normal electrode plate by the inspection part 140 may be transferred to the second transfer part 150, and a defective electrode plate 11b that is determined as a defective electrode plate by the inspection part 140 may be suctioned by a discharge member and then removed from the first transfer part 130. Thus, the transfer of the defective electrode plate to the second transfer part 150 may be prevented, and thermally bonding the defective electrode plate to the separator sheet may be prevented.

When the defective electrode plate 11b transferred to the first transfer part 130 is removed, the rotation rate of the first transfer part 130 is increased to re-adjust a distance between a preceding electrode plate and a following electrode plate with respect to the removed defective electrode plate 11b. Thus, the distance between the preceding electrode plate and the following electrode plate with respect to the removed defective electrode plate 11b may be uniformly maintained.

In the fifth step, the normal electrode plate 11a that is determined as a normal electrode plate by the inspection part 140 is transferred to the lamination part 160 through the second transfer part 150.

In particular, the second transfer part 150 comprises a second conveyor belt that transfers the normal electrode plate 11a to transfer the normal electrode plates 11a at predetermined intervals through the second conveyor belt.

Here, the second transfer part 150 comprises a second adjustment roller 152 that adjusts a position of the normal electrode plate 11a seated on the second conveyor belt 151. The second adjustment roller 152 press-rolls the normal electrode plate 11a seated on, the second conveyor belt 151 and simultaneously adjusts a position of the normal electrode plate 11a in a width direction.

In the sixth step, the normal electrode plate 11a transferred by the second transfer part 150 and the separator sheet 20 supplied from the separator supply roller 111 are thermally bonded to each other through the lamination part 160 to manufacture a radical unit sheet.

The separator between the normal electrode plates that correspond to each other may be cut in the radical unit sheet to manufacture a radical unit. One or more radical units may be laminated to manufacture an electrode assembly, and the electrode assembly may be accommodated in a case to manufacture a secondary battery as a finished product.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A lamination apparatus for a secondary battery, which thermally bonds a separator sheet to an electrode plate in a state in which the separator sheet and the electrode plate are laminated, the lamination apparatus comprising: a roller part including a separator supply roller that supplies the separator sheet and an electrode supply roller that supplies the electrode sheet; a cutting part that cuts the electrode sheet supplied by the electrode supply roller to manufacture a plurality of electrode plates; a first transfer part that transfers the electrode plates cut by the cutting part at a same interval; an inspection part that inspects whether the electrode plates transferred by the first transfer part are defective; a second transfer part that transfers a normal electrode plate, which is determined as the normal electrode plate by the inspection part, among the electrode plates; and a lamination part that thermally bonds the normal electrode plate transferred by the second transfer part to the separator sheet supplied by the separator supply roller, wherein the inspection part comprises a photographing member that photographs the electrode plate transferred by the first transfer part and an inspection member that compares a photograph of the electrode plate, which is photographed by the photographing member, with an inputted photograph of the electrode plate to inspect whether the electrode plate is defective, wherein the inspection part further comprises a discharge member that discharges a defective electrode plate, which is determined as the defective electrode plate by the inspection member, from the first transfer part, and wherein the first transfer part and the second transfer part rotate at a same rotation rate to uniformly maintain a distance between the electrode plates transferred by the first transfer part and the second transfer part, and when the defective electrode plate among the electrode plates transferred by the first transfer part is discharged, a rotation rate of the first transfer part is increased to be greater than a rotation rate of the second transfer part to re-adjust a distance between a preceding electrode plate and a following electrode plate with respect to the defective electrode plate to again uniformly maintain the distance between the preceding electrode plate and following electrode plate the same as the distance between the electrode plates transferred by the first transfer part and the second transfer part wherein the first transfer part comprises a first conveyor belt that transfers the electrode plates cut by the cutting part at predetermined intervals, and wherein the first transfer part further comprises a first adjustment roller that adjusts a position of the electrode plates in a width direction of the electrode plates while press-rolling a top surface of the electrode plates transferred by the first conveyor belt, wherein, when the rotation rate of the first transfer part is increased to be greater than the rotation rate of the second transfer part, an inspection speed of the inspection part is also increased to uniformly maintain the distance between the preceding electrode plate and following electrode plate the same as the distance between the electrode plates transferred by the first transfer part and the second transfer part, and wherein only the rotation rate of the first transfer part is increased when the distance between the preceding electrode plate and following electrode plate is to be uniformly maintained.

2. The lamination apparatus of claim 1, wherein the cutting part cuts the electrode sheet to manufacture an electrode plate on which an electrode tab is provided, and the inspection member inspects whether a connection state of the electrode tab provided on the electrode plate is defective.

3. The lamination apparatus of claim 1, wherein, when the discharge member discharges the defective electrode plate disposed on an end of the first transfer part in a transfer direction of the first transfer part, the rotation rate of the first transfer part is increased to re-adjust a distance between the preceding electrode plate and the following electrode plate with respect to the defective electrode plate is made uniform.

4. The lamination apparatus of claim 1, wherein the second transfer part comprises a second conveyor belt that transfers the normal electrode plate, which is determined as the normal electrode plate by the inspection part, at predetermined intervals.

5. The lamination apparatus of claim 4, wherein the second transfer part further comprises a second adjustment roller that adjusts a position of the normal electrode plate in a width direction of the electrode plate while press-rolling the normal electrode plate transferred by the second conveyor belt.

* * * * *